Aug. 14, 1934. H. E. TAUTZ 1,969,827

SCROLL SAW CHUCK

Original Filed Dec. 11, 1931

WITNESSES

INVENTOR
Herbert E. Tautz
By R. S. Caldwell
ATTORNEY

Patented Aug. 14, 1934

1,969,827

UNITED STATES PATENT OFFICE 1,969,827

SCROLL SAW CHUCK

Herbert E. Tautz, Milwaukee, Wis., assignor to Delta Manufacturing Company, Milwaukee, Wis., a corporation of Wisconsin Original application December 11, 1931, Serial No. 580,340. Divided and this application July 22, 1932, Serial No. 623,986

2 Claims. (Cl. 279—44)

The invention relates to scroll saws, and has for an object the provision of a scroll saw which can be operated with a variety of cutting members, such as pin blades, jewelers' blades, saber blades, machine files, and sanding devices, and in which the same chuck means are capable of clamping the various cutting members.

Another object of the invention is to provide a chuck comprising a plurality of substantially flat jaw members having a holder and a single means for clamping all the jaws against one another whereby a tool or the like may be secured between any two of the said jaw members without removing or in any way changing the remaining ones.

A further object of the invention is to perfect details of construction of the chuck means.

The invention further consists in the several features hereinafter set forth and more particularly defined by the annexed claims.

This application constitutes a division of my application for Scroll saws, Serial No. 580,340, filed Dec. 11, 1931, now Patent No. 1,877,705.

In the accompanying drawing, Fig. 1 is a fragmentary sectional elevation of a scroll saw embodying the chuck means of this invention;

Figure 1:
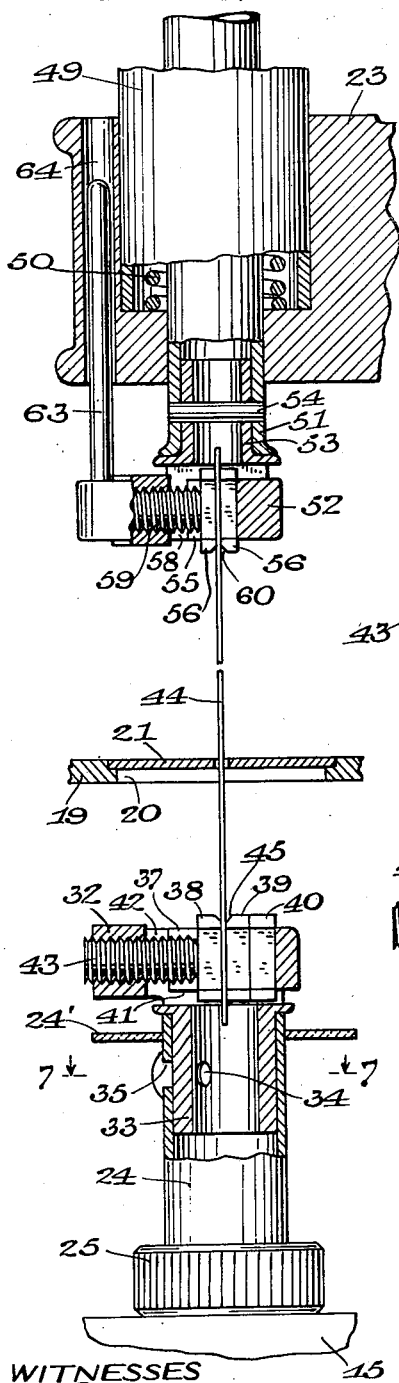

In the drawing, 15 indicates the main drive housing of a scroll saw, and 23 an upper stationary support spaced above the drive housing. A tiltably mounted work table 19 is disposed between the drive housing and upper support and is provided with a circular rabbeted opening 20 within which removably fits a radially slotted insert disk 21 through which the cutting blades are passed.

A vertical tubular plunger 24 projects upwardly from within the drive housing 15 and is slidably mounted in a bushing 25 secured in the housing. The tubular plunger 24 is reciprocated by any suitable mechanism, preferably located within the drive housing.

Figure 4:
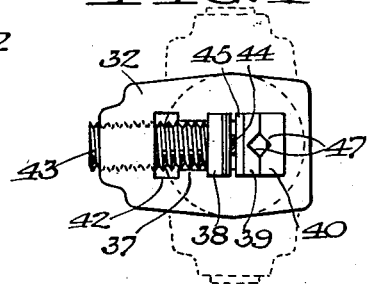
Fig. 4 is a top plan view of the lower chuck as it appears when clamping a pin blade or jeweler's blade, two other angular positions of the chuck being indicated in dotted lines.
Figure 7:
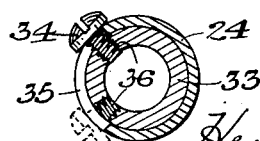
Fig. 7 is a transverse sectional view of the lower chuck taken along the line 7—7 of Fig. 1.

A chuck body 32 is provided with a tubular shank 33 which rotatably fits within the upper end of the reciprocatory tubular plunger 24. The shank 33 is secured to the plunger by a screw 34 passing through a horizontal slot 35 in the plunger, and selectively threaded into one or the other of a pair of openings 36 (Fig. 7), formed in the shank. The slot 35 is of such circumferential length as to permit a quarter turn of the chuck body when the screw is in one of the openings 36, and another quarter turn when the screw is threaded into the other opening, thus permitting the chuck body to turn through an angle of substantially 180° about the axis thereof, whereby in the present specific form it is capable of occupying any one of the three positions shown in Fig. 4, two of which are indicated in dotted lines. The screw 34 is tightened to clamp the chuck body in its selected position on the plunger. The removal of the screw 34 permits the chuck to be removed for cleaning or other purposes. A fiber dust washer 24' is carried on the upper portion of the plunger 24.

The chuck body 32 is provided with an upwardly opening slot 37 extending transversely of the path of movement of the chuck body and slidably receiving therein the reduced intermediate portions of a plurality of chuck jaws, three in the example illustrated, namely 38, 39, and 40. The laterally projecting upper ends or lugs of the chuck jaws are engageable with the upper face of the chuck body, and the laterally projecting lower ends or lugs of the chuck jaws are engageable with shoulders or ways 41 within the chuck body. The slot 37 has an enlarged end portion 42 permitting insertion and removal of the chuck jaws. A horizontally extending set screw 43, preferably of the so-called headless or socket-head type, is threaded into the chuck body to place clamping pressure on the chuck jaws.

The chuck jaws 38 and 39 are adapted to clamp therebetween the lower end portion of a saw blade 44, here indicated to be a pin blade, the blade being arranged to extend along the longitudinal axis of the chuck. The jaws 38 and 39 are chamfered at 45 to facilitate the entrance of the blade and are provided with V notches 46 at their lower ends to receive the cross pin of the blade and to center the blade along the axis of the chuck body. When jewelers' blades are used they are also clamped between the jaws 38 and 39.

Figure 5:
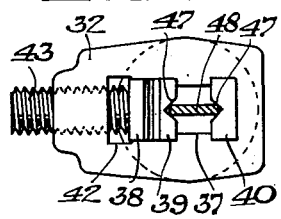
Fig. 5 is another top plan of the lower chuck, as it appears when clamping a saber blade.
Figure 6:
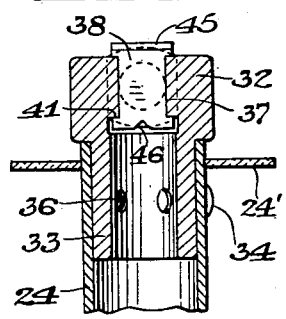
Fig. 6 is a sectional elevation of the lower chuck taken at right angles to the plane of Fig. 1.

The chuck jaws 39 and 40 are provided with longitudinal complementary notches 47 for receiving therein the opposite edges of the saber blade 48, as seen in Fig. 5. The notched jaws 39 and 40 are also adapted to receive other cutting elements, such as machine files or sanding attachments. The intermediate chuck jaw 39 is adjacent the longitudinal axis of the shank 33, so that each of the cutting elements 44 and 48 will be arranged near such axis.

The upper support 23 of the machine has secured therein an upstanding tube 49, which houses a coiled spring 50 or the like for applying tension to the blade, as usual with all scroll saws. A tubular plunger 51 is slidably and rotatably mounted in the support 23 and is urged upwardly by the spring 50, the plungers 51 and 24 being in axial alignment with one another. An upper chuck body 52, provided with a reduced tubular shank 53 fitting within the plunger 51, is secured thereto by a cross pin 54.

Figure 2:
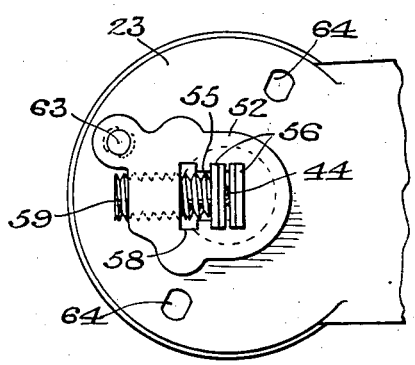
Fig. 2 is a bottom plan view of the upper blade chuck.
Figure 3:
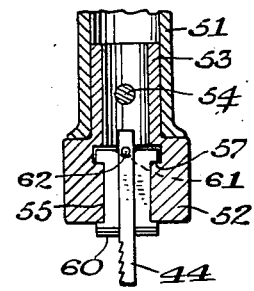
Fig. 3 is a sectional elevation of the upper blade taken at right angles to the plane of Fig. 1.

The chuck body 52 is provided with a downwardly opening slot 55 extending transversely of the path of movement of the chuck body and slidably receiving therein the reduced intermediate portions of a pair of chuck jaws 56. The laterally projecting lower ends or lugs of the chuck jaws are engageable with the lower face of the chuck body, and the laterally projecting upper ends or lugs of the chuck jaws are engageable with shoulders or ways 57 (Fig. 3) within the chuck body. The slot 55 has an enlarged end portion 58 (Fig. 2) permitting insertion and removal of the chuck jaws. A horizontally extending set screw 59, preferably of the headless or socket-head type, is threaded into the chuck body to place clamping pressure on the chuck jaws.

The chuck jaws 56 are adapted to clamp therebetween the upper end portion of the saw blade 44, the blade being arranged to extend along the longitudinal axis of the chuck. The jaws 56 are chamfered at 60 (Fig. 1) to facilitate the entrance of the blade and are provided with V notches 61 (Fig. 3) at their upper ends to receive the cross pin 62 of the blade. When jewelers' blades are used, they are also clamped between the jaws. When rigid cutting elements are used, such as saber blades or machine files, the upper chuck need not be used.

The upper chuck body 52 carries thereon an upstanding pin 63 which is adapted to enter any one of three vertical openings 64 formed in the support 23, thus permitting the chuck body 52 to be held in any one of three angular positions to correspond with the position of the lower chuck body 32. To change the angular position of the chuck body 52, the body is pulled downwardly against the action of the spring 50 to release the pin 63 from the support 23.

Suitable means, not shown, may be provided as usual above the work table 19 for guiding the saw blade, file, etc., holding down the work, and blowing away the saw dust or the like.

In operation, the saw blade is reciprocated by the lower plunger 24 to which it is secured by the lower chuck, the blade being held under tension by the axially movable spring-pressed upper chuck. When using saber blades, machine files, and sanding devices, the upper chuck preferably is not used. While provision is made in the chucks for accommodating the cross pins of the pin blades, it is not necessary to rely on these pins for holding action, since the clamping action of the jaws is sufficient. However, the pins have a holding action while the chuck jaws are being clamped or loosened.

What I claim as new and desire to secure by Letters Patent is:

1. In a scroll saw, the combination of a chuck body having an opening, a pair of flat chuck jaws fitting in said opening and having adjacent tool-engaging faces, said chuck jaws at one end each having a chamfered edge for admitting a tool between said faces, and each having a cross pin receiving notch at its opposite end, and means in said chuck body for applying clamping pressure to said jaws.

2. A chuck for holding saw blades and the like, comprising a chuck body having an opening, a pair of chuck jaws fitting in said opening, said jaws having adjacent tool-clamping faces and having cross pin receiving notches substantially at right angles to said faces and intersecting said faces, and means for applying clamping pressure to said jaws.

HERBERT E. TAUTZ.